(12) United States Patent
Blache et al.

(10) Patent No.: US 11,371,790 B2
(45) Date of Patent: Jun. 28, 2022

(54) HOUSING

(71) Applicant: RHEINMETALL WAFFE MUNITION GMBH, Unterluess (DE)

(72) Inventors: Andreas Blache, Unterluess (DE); Heiner Schmees, Unterluess (DE)

(73) Assignee: Rheinmetall Waffe Munition GmbH, Unterluess (DE)

( * ) Notice: Subject to any disclaimer, the term of this patent is extended or adjusted under 35 U.S.C. 154(b) by 23 days.

(21) Appl. No.: 17/081,729

(22) Filed: Oct. 27, 2020

(65) Prior Publication Data

US 2021/0041196 A1 Feb. 11, 2021

Related U.S. Application Data

(63) Continuation of application No. PCT/EP2019/056405, filed on Mar. 14, 2019.

(30) Foreign Application Priority Data

Apr. 27, 2018 (DE) ..................... 20 2018 102 366.7

(51) Int. Cl.
*F41A 3/66* (2006.01)
*B23C 3/00* (2006.01)

(52) U.S. Cl.
CPC ................ *F41A 3/66* (2013.01); *B23C 3/002* (2013.01)

(58) Field of Classification Search
CPC ....................................................... F41A 3/66
USPC ...................................................... 89/9, 125
See application file for complete search history.

(56) References Cited

U.S. PATENT DOCUMENTS

| 5,501,493 | A | 3/1996 | Arthur |
| 5,908,299 | A | 6/1999 | Dehoff et al. |
| 6,174,168 | B1 | 1/2001 | Dehoff et al. |
| 6,487,806 | B2 | 12/2002 | Murello et al. |
| 9,810,493 | B2 | 11/2017 | Fluhr et al. |
| 9,835,397 | B2 | 12/2017 | Stussak |
| 2002/0157297 | A1 | 10/2002 | Murello |
| 2006/0101692 | A1 | 5/2006 | Falenwolfe |
| 2008/0216375 | A1 | 9/2008 | Barrett |
| 2014/0230298 | A1* | 8/2014 | King, Jr. ................ B23P 15/00 42/16 |

(Continued)

FOREIGN PATENT DOCUMENTS

| DE | 29709330 U1 | 9/1997 |
| DE | 19953365 A1 | 5/2001 |
| DE | 19903328 B4 | 11/2004 |

(Continued)

OTHER PUBLICATIONS

How Billet AR-15 Receivers Are Made—Houlding Precision Firearms (Internet video; https://www.youtube.com/watch?v=Ld_ENLh7B8o) (Year: 2014).*

(Continued)

*Primary Examiner* — Reginald S Tillman, Jr.
(74) *Attorney, Agent, or Firm* — Muncy, Geissler, Olds & Lowe, P.C.

(57) ABSTRACT

A method for producing a weapon housing and to a weapon housing. Said method is characterized in that the weapon housing includes at least two sub-assemblies, an inner contour being cut into at least one solid block for each sub-assembly. The solid block is a steel block. Openings and recesses are introduced into the at least two sub-assemblies.

6 Claims, 2 Drawing Sheets

(56) References Cited

U.S. PATENT DOCUMENTS

2014/0331535 A1    11/2014   Robinson et al.

FOREIGN PATENT DOCUMENTS

| | | |
|---|---|---|
| DE | 102004021952 B3 | 12/2005 |
| DE | 102012019422 B3 | 4/2014 |
| DE | 102013003435 A1 | 8/2014 |
| DE | 202019100099 U1 * | 2/2019 |
| JP | H09103438 A | 4/1997 |
| WO | WO2007045421 A1 | 4/2007 |

OTHER PUBLICATIONS

International Search Report dated May 14, 2019 in corresponding application PCT/EP2019/056405.
Japanese Office Action dated Jan. 4, 2022 in corresponding application 2020-547137.

* cited by examiner

HOUSING

This nonprovisional application is a continuation of International Application No. PCT/EP2019/056405, which was filed on Mar. 14, 2019, and which claims priority to German Patent Application No. 20 2018 102 366.7, which was filed in Germany on Apr. 27, 2018, and which are both herein incorporated by reference.

BACKGROUND OF THE INVENTION

Field of the Invention

The present invention relates to a weapon housing, in particular for machine guns. The invention also relates to a method for producing the weapon housing.

Description of the Background Art

Weapon housings for machine guns such as for the MG3, for example, are in practice produced as semi-finished products from sheet metal using a bending/stamping method. The basic shape would be cut out of the sheet metal for this purpose. This was followed by bending with intermediate annealing, etc., so that the stresses caused by bending were once again removed. The curved piece was then riveted to the sheet metal, the sheet-metal housing welded, and the guide rails/guide strips of a bolt carrier riveted. The disadvantage is that the production of this housing is also only feasible to a limited extent for material reasons. In addition, the bending/stamping method is only carried out by a small number of manufacturers. The devices required for this wear out and their replacement is time-consuming and expensive.

SUMMARY OF THE INVENTION

It is therefore an object of the present invention to provide a method that can be used to produce a weapon housing.

The idea on which the solution is based is that of cutting the housing from a solid material, a steel block. This process gives rise to the possibility of changing the material and using new materials which allow cutting in the form of machining from a material block, for example. This possibility emerges since formability is no longer necessary to the extent required with the earlier bending/stamping production.

According to the new production method, the following methods, among others, can be used:
- C35(E) (carbon 35%, electrofusion) in the normalized state;
- C35(E) in the hardened state;
- C40(E) in the normalized state.

In the case of small structural changes which do not necessitate direct hardening of the weapon housing, the following material groups are likewise conceivable:
- traditional unalloyed structural steels, e.g. S355;
- micro-alloyed structural steels,
- titanium alloys, e.g. TiAl6V4.

The cutting of small parts of a weapon is disclosed by DE 199 53 365 A1 (which corresponds to US2002/0157297), DE 10 2004 021 952 B3 or DE 10 2012 019 422 B3 (which corresponds to U.S. Pat. No. 9,810,493), for example. There is no reference in these documents to the use of this method for a weapon housing too.

The outcome of the manufacture is that the weapon housing comprises a thin-walled hollow body with various openings and breakthroughs. For cutting the inner contour, it is therefore provided that the weapon housing is preferably made up of two half shells, the inner contour of which is created separately in each case. To simplify production, these half shells can be subdivided into further individual parts. These individual or multiple shells are finally welded to one another, for example.

The cutting of the housing parts represents a challenge in the case of small housing thicknesses. This requires devices which support the housing parts over the largest surface possible from the outside during internal machining and from the inside during external machining.

The advantage of this solution is that standard machine tools can be used. With a corresponding raw material, virtually distortion-free production is possible. Different material strengths no longer lead to different rebending. A tool adjustment is no longer necessary. Production in low numbers is also feasible based on economic criteria. Production can still be economical, in particular for small and medium batch sizes too.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
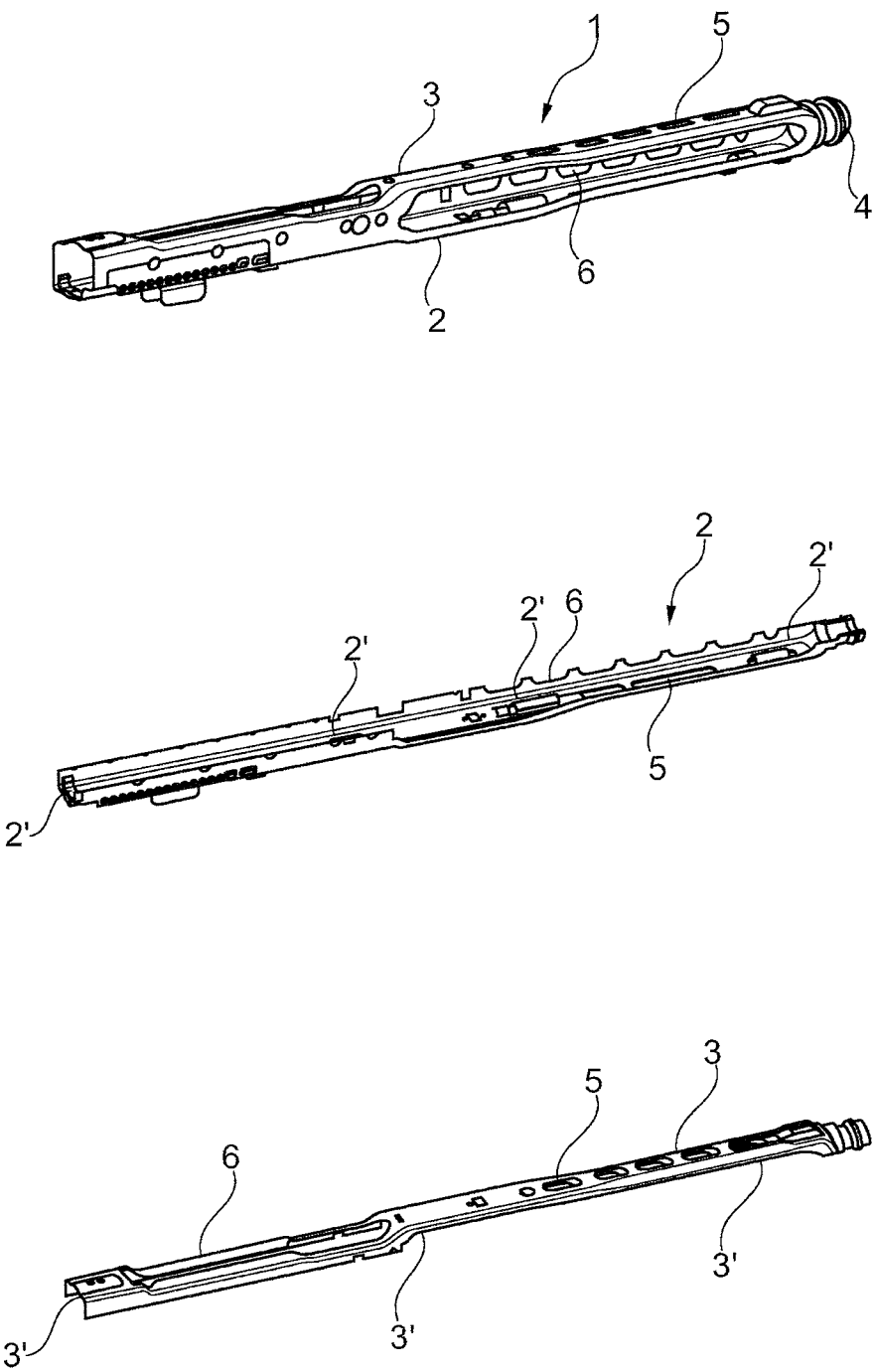
FIG. 1 shows a weapon housing comprising an upper shell and a lower shell.

A weapon housing of an automatic weapon or machine gun which is not depicted in greater detail is denoted as 1 in FIG. 1. The weapon housing 1 is preferably two-part and has a lower shell 2 and an upper shell 3 as lower subassemblies of the weapon housing 1. Openings 5 or recesses 6 are contained in the lower shell 2 and in the upper shell 3. A barrel support 4 of the gun barrel which is not depicted in greater detail is created on the front side by the two shells 2, 4.

Figure 2:
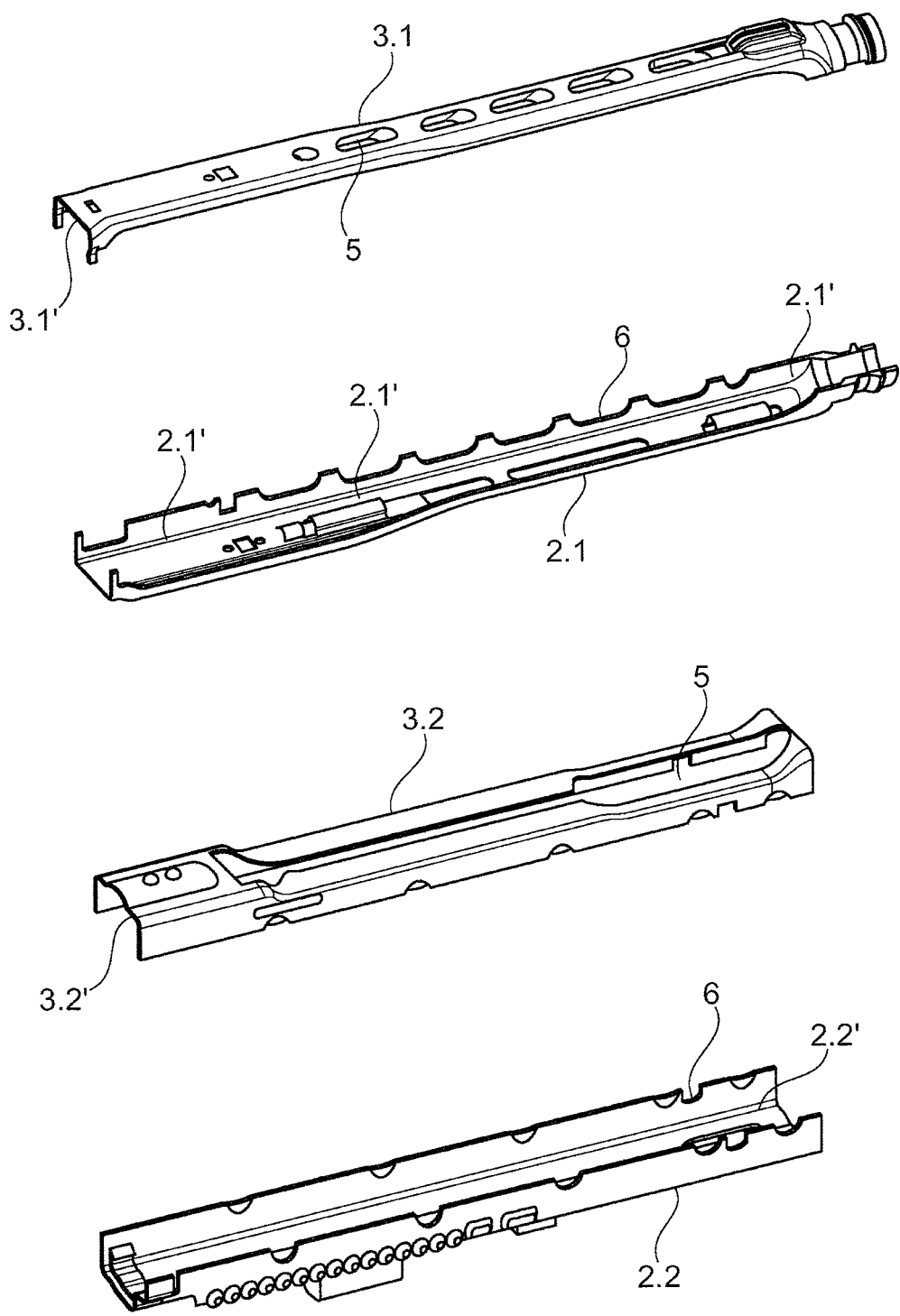
FIG. 2 shows a further subdivision of the upper shell and the lower shell into multiple individual parts.

FIG. 2 shows the lower shell 2 and the upper shell 3 from FIG. 1 which have been divided into two further subassemblies 2.1, 2.2 and 3.1, 3.2. These subassemblies 2.1, 2.2, 3.1, 3.2 can be broken down further in order to achieve production simplification.

The production of the weapon housing 1 takes place as follows:

A steel block is used which corresponds to the size of the respective subassembly 2, 3, 2.1, 2.2, 3.1, 3.2. The steel block should preferably correspond at least in length. An inner contour 2', 3', 2.1', 2.2', 3.1', 3.2' and openings 5 and recesses 6 are preferably milled (milled in or milled out) in this steel block. The thickness of the housing wall is preferably around 2.5 mm, but this does not have limiting force.

The subassemblies 2, 3 or the subassemblies 2.1, 2.2 and 3.1, 3.2 are then connected, preferably welded, to one another, in order to create the weapon housing 1.

It is self-evident that the inner contours 2', 3', 2.1', 2.2', 3.1', 3.2 also contain necessary guide rails, etc. However, these may also be introduced into the weapon housing subsequently as separate components, for example by riveting or welding.

As already stated, the steel block may be made from a material such as C35(E) in the normalized state, C35(E) in the hardened state or C40(E) in the normalized state. Alternatives are known in the art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing a weapon housing, the method comprising:
    providing at least two subassemblies for the weapon housing; and
    cutting an inner contour into at least one solid block for each of the at least two subassemblies,
    wherein each of the at least two subassemblies is formed as a half shell, such that a lower half shell and an upper half shell are provided, the lower half shell and the upper half shell, on a front side thereof, form a barrel support for a gun barrel,
    wherein the inner contour as well as openings and recesses are introduced into the at least two subassemblies by cutting into the at least one solid block to form the lower half shell and the upper half shell, and
    wherein the lower half shell and the upper half shell are joined to each other by welding to form the weapon housing.

2. The method as claimed in claim 1, wherein the at least one solid block is a steel block.

3. A weapon housing comprising:
    a first subassembly; and
    a second subassembly,
    wherein an inner contour is machined into at least one solid block for the first and the second subassembly,
    wherein each of the first subassembly and the second subassembly is formed as a half shell, such that a lower half shell and an upper half shell are provided, the lower half shell and the upper half shell, on a front side thereof, form a barrel support for a gun barrel,
    wherein the inner contour as well as openings and recesses are introduced into the first and the second subassembly by cutting into the at least one solid block to form the lower half shell and the upper half shell, and
    wherein the lower half shell and the upper half shell are joined to each other by welding to form the weapon housing.

4. The weapon housing as claimed in claim 3, wherein the at least one solid block is a steel block.

5. The weapon housing as claimed in claim 3, wherein the weapon housing comprises more subassemblies than the first and the second subassembly.

6. The weapon housing as claimed in claim 3, wherein a material of the weapon housing is a C35(E) in the normalized state, a C35(E) in the hardened state, or a C40(E) in the normalized state.

* * * * *